(12) United States Patent
Ming et al.

(10) Patent No.: US 6,703,965 B1
(45) Date of Patent: Mar. 9, 2004

(54) MOTION DETECTOR (75) Inventors: Su Guang Ming, Singapore (SG); Wen Xiao Ping, Singapore (SG); Sun Ying Xin, San Jose, CA (US); Ng Yew Hoe Joseph, Paignton (GB)

(73) Assignee: Agilis Communication Technologies PTE LTD (SG)

( * ) Notice: Subject to any disclaimer, the term of this patent is extended or adjusted under 35 U.S.C. 154(b) by 0 days.

(21) Appl. No.: 10/089,592
(22) PCT Filed: May 2, 2000
(86) PCT No.: PCT/SG00/00065
§ 371 (c)(1),
(2), (4) Date: Mar. 28, 2002
(87) PCT Pub. No.: WO01/25818
PCT Pub. Date: Apr. 12, 2001

(30) Foreign Application Priority Data
Oct. 1, 1999 (SG) .............................................. 9904864

(51) Int. Cl.[7] .................................................. G01S 7/28
(52) U.S. Cl. .......................... 342/28; 342/175; 455/327
(58) Field of Search .................... 342/28, 175; 455/327

(56) References Cited

U.S. PATENT DOCUMENTS

| | | | | |
|---|---|---|---|---|
| 3,845,461 A | * | 10/1974 | Foreman ...................... 367/94 |
| 3,955,194 A | * | 5/1976 | Chua .......................... 342/114 |
| 4,286,260 A | * | 8/1981 | Gershberg et al. .......... 340/554 |
| 4,731,611 A | * | 3/1988 | Muller et al. ................. 342/28 |
| 4,931,799 A | * | 6/1990 | Wen et al. ................... 342/110 |
| 5,262,783 A | | 11/1993 | Philpott et al. ............... 342/28 |
| 5,497,163 A | | 3/1996 | Lohninger et al. .......... 342/175 |
| 5,761,616 A | * | 6/1998 | Lohninger ................. 455/327 |
| 5,764,189 A | | 6/1998 | Lohninger ........... 343/700 MS |
| 5,977,874 A | | 11/1999 | Konstandelos ............... 340/554 |
| 5,986,600 A | * | 11/1999 | McEwan ..................... 342/28 |
| 6,091,355 A | * | 7/2000 | Cadotte, Jr. et al. ........ 342/104 |

FOREIGN PATENT DOCUMENTS

WO    WO 97/01766    1/1997

OTHER PUBLICATIONS

New Japan Radio Co., Ltd., 1999 brochure.
Microwave Solutions Limited, 2000 brochure.
MDT Microwave Device Technology, www.mdtcorp.com, pp. 1–2, May 15, 2002.

* cited by examiner

Primary Examiner—John B. Sotomayor
(74) Attorney, Agent, or Firm—Knobbe Martens Olson & Bear LLP (57) ABSTRACT

The present motion detector unit effectively suppresses harmonic frequencies and is cost-effective to build. The motion detector unit includes a main casing which houses the main microwave circuit board (3). Enclosing the casing and the circuit board (3) is a cover. An antenna circuit board is attached to the bottom side of the main casing. The cover has partitioning walls at the bottom side of the cover which press against the main microwave circuit board (3) when the cover is enclosed over the casing. The circuit on the main microwave circuit board (3) includes a microwave oscillator for producing an oscillatory signal. The oscillator is coupled to a ground and to a filter which is a low-pass filter with a relatively wide stop bandwidth. The filter is then coupled to a transmitting antenna. A power supply is routed through the transmission antenna and provides DC voltage to the microwave oscillator. The oscillator is further coupled to a mixer. The mixer is coupled to a filter which is in turn coupled to a receiving antenna.

22 Claims, 7 Drawing Sheets

MOTION DETECTOR

FIELD OF THE INVENTION

The present invention relates generally to the field of the motion detectors, and in particular, to a motion detector which can efficiently and cost-effectively suppress harmonic frequencies emanating from the motion detector.

BACKGROUND OF THE INVENTION

It is a well known fact that motion detector units utilising the Doppler effect for motion detection radiate unwanted harmonic frequencies along with the main signal, or the fundamental frequency. Most countries require that any motion detection units being sold must comply with their requirements for harmonic suppression. The requirements vary from country to country. Some require that only the second harmonic be suppressed, while others who are more stringent, require suppression up to the third harmonic frequency.

The motion detector manufacturing industry has employed various ways to meet the requirements. At least one method is disclosed in U.S. Pat. No. 5,262,783 (U.K. Patent Application No. GB 2253108A).

Because a motion detector must meet various regulatory and commercial requirements, producing a commercially viable motion detector unit is not easy particularly in those countries where the suppression must reach the third harmonic. To address all of the concerns, not only must the motion detector meet the harmonic suppression requirement (which in itself is not easy) it must also prevent any undue degradation of the main signal such that the intended function of the motion detector is not compromised. Moreover, motion detector unit must be cost competitive.

As in many industries, cost is an important consideration when designing a motion detector unit. While it is not necessarily difficult to design a motion detector unit to meet the technical specification of a particularly country, it is often difficult to reduce the cost of the unit to a point which is commercially competitive. Hence, any motion detector design which can facilitate cost saving without causing performance degradation would be highly useful in the motion detector manufacturing industry.

OBJECT OF THE INVENTION

Therefore, it is the general object of the present invention to overcome the shortcomings of the prior art motion detectors as mentioned above.

It is another object of the present invention to provide a cost-effective motion detector which can effectively suppress harmonic frequencies.

SUMMARY OF THE INVENTION

The present motion detector unit effectively suppresses harmonic frequencies and is cost-effective to build. The motion detector unit includes a main casing which houses the main microwave circuit board. Enclosing the casing and the circuit board is a cover. An antenna circuit board is attached to the bottom side of the main casing. The cover has partitioning walls at the bottom side of the cover which press against the main microwave circuit board when the cover is enclosed over the casing. The main circuit board has a plated bottom side and a top side which carries the microwave circuitry. The plated bottom side of the main circuit board makes electrical contact with the floor of the casing which is also made of conductive material such as EMI-shielded plastic or aluminum to provide a ground plane for the circuitry. The antenna board has a plated bottom side which makes electrical contact with the bottom side of the casing.

The circuit for the present motion detector includes a microwave oscillator for producing an oscillatory signal. In the preferred embodiment, the signal operates at an "X-band" frequency in the range of 9.35 GHz to 10.687 GHz, though other frequencies are possible. The oscillator is coupled to a filter which is a low-pass filter with a relatively wide stop bandwidth. The filter is then coupled to a transmitting antenna which radiates a microwave signal to a target such as a human being. A power supply is routed through the transmission antenna and provides DC voltage to the microwave oscillator. The oscillator is further coupled to a mixer. The mixer is coupled to a filter which is in turn coupled to a receiving antenna. The receiving antenna receives the microwave signal which is reflected back from the target. The mixer mixes the original signal from the oscillator and the reflected signal received through the receiving antenna to generate an intermediate frequency (IF) which is sent to an output channel through the filter. The output IF signal can then be sent to an external circuitry for processing. Typically, an amplifier and a DC-blocking capacitor are required to interface with the output channel.

The main circuit board includes a plurality of plated grounding through-holes which are arranged in an elongated pattern which compartmentalize the circuitry. In this embodiment, there are four main compartments. The first compartment contains the circuitry for the microwave oscillator; the second compartment contains the circuitry for the filter; the third compartment contains the circuitry for the mixer; and the fourth compartment contains the circuitry for the filter.

The antenna circuit board comprises separate transmit and receive antenna arrays. Each antenna array comprises two patch elements which are connected to common feed striplines. The stripline for the transmit array is connected via a wire to the power supply. The stripline for the receive array is connected via a wire to the output channel which carries the intermediate frequency.

The bottom side of the cover has a set of partitioning walls which are arranged in a pattern to coincide with the pattern of the plated grounding through-holes. The partitioning walls generally define four compartmentalized cavities. When the cover is placed over the circuit board, the respective cavities enclose their respective compartments. In the preferred embodiment, the height of the partitioning walls is quarter wavelength of the operating frequency of the microwave oscillator.

When the cover is properly enclosed over the casing carrying the main circuit board, the partitioning walls should press firmly against the plated grounding through-holes to assist in providing a good contact between the circuit board and the plated floor of the casing. The partitioning walls assist in harmonic suppression by isolating the microwave circuitry to reduce any coupling of signals, and by shorting to ground any leakage of harmonic radiation which may occur.

DETAILED DESCRIPTION OF THE INVENTION

Figure 1:
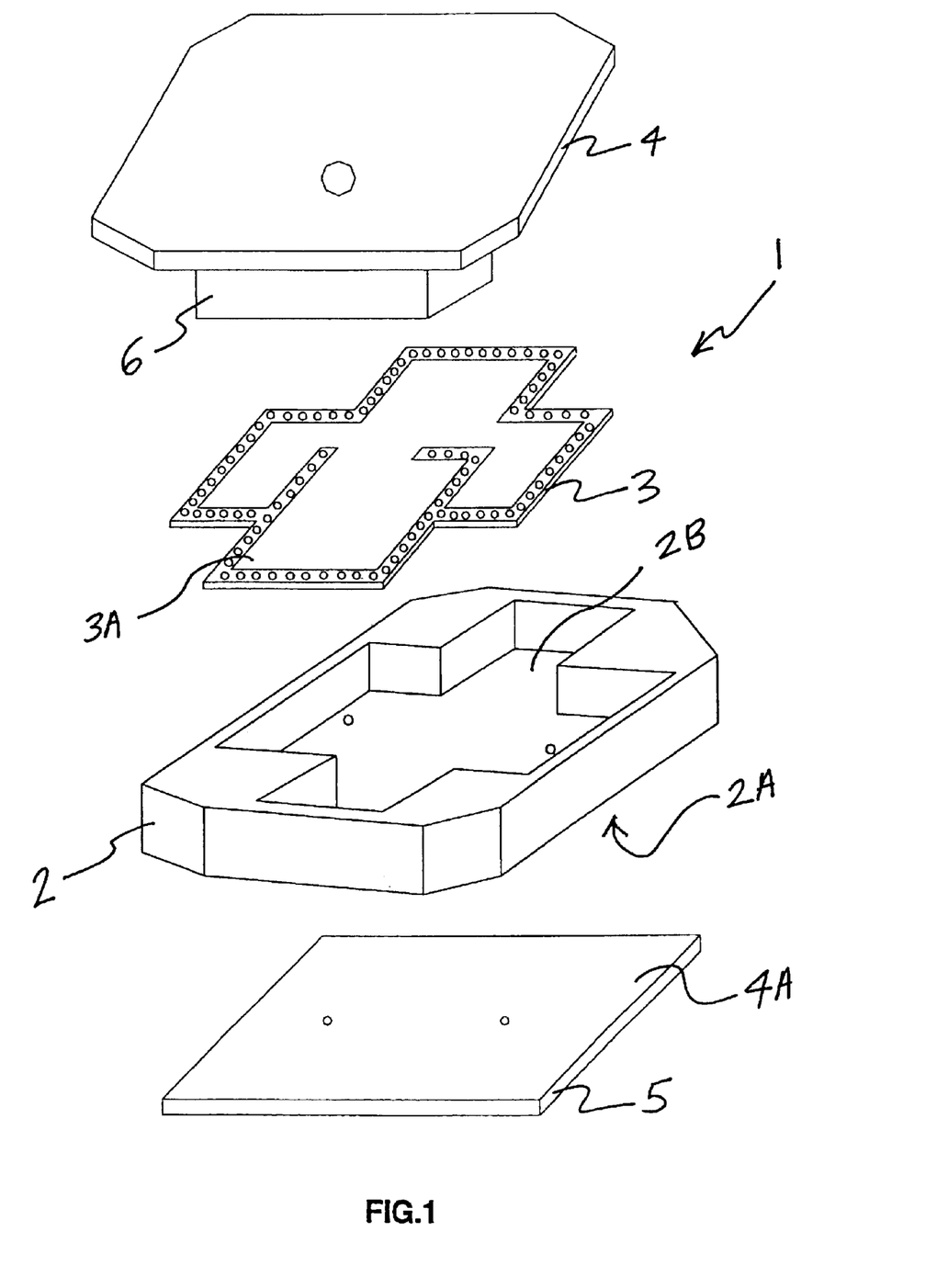
FIG. 1 is a perspective diagram illustrating the physical layout of the motion detector operating at the X-band frequency.

FIG. 1 illustrates the physical layout of the preferred embodiment of the present motion detector unit. The unit 1 includes a main casing 2 which houses the main microwave circuit board 3. Enclosing the casing 2 and the circuit board 3 is the cover 4. The antenna circuit board 5 is attached to the bottom side 2A of the main casing 2. In the preferred embodiment, both the casing 2 and the cover 4 are made of conductive material such as EMI-shielded plastic or aluminum. The circuit board 3 and the antenna circuit board is made of standard PCB (printed circuit board) materials such as FR4.

Figure 5:
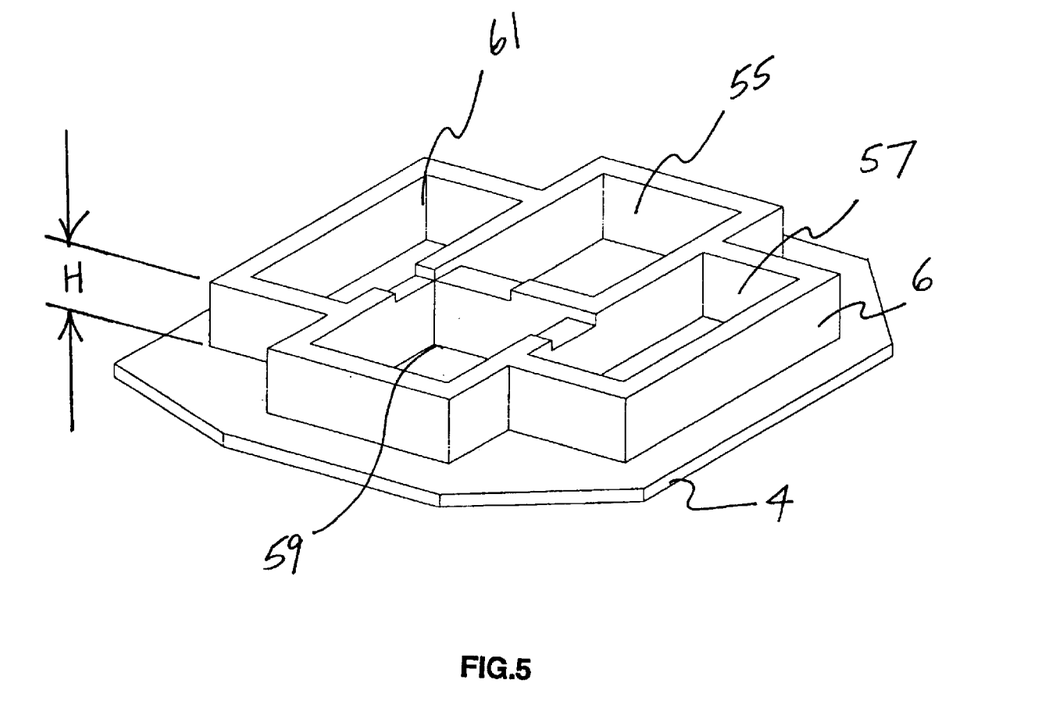
FIG. 5 is a perspective diagram of the bottom side of the cover for the motion detector operating at the X-band frequency.

Still referring to FIG. 1, the cover 4 has partitioning walls 6 at the bottom side of the cover (the details of which are shown in FIG. 5) which press against the main microwave circuit board 3 when the cover is enclosed over the casing 2. The main circuit board 3 has a plated bottom side (side opposite to the top side 3A) and a top side 3A which carries the microwave circuitry. The plated bottom side of the main circuit board 3 makes electrical contact with the floor 2B of the casing 2 which is also conductive to provide a ground plane for the circuitry. The antenna board 5 has a plated bottom side 4A which makes electrical contact with the bottom side 2A of the casing 2. The antenna components are located on the antenna circuit board 5 on the side opposite to the bottom side 4A.

Figure 2:
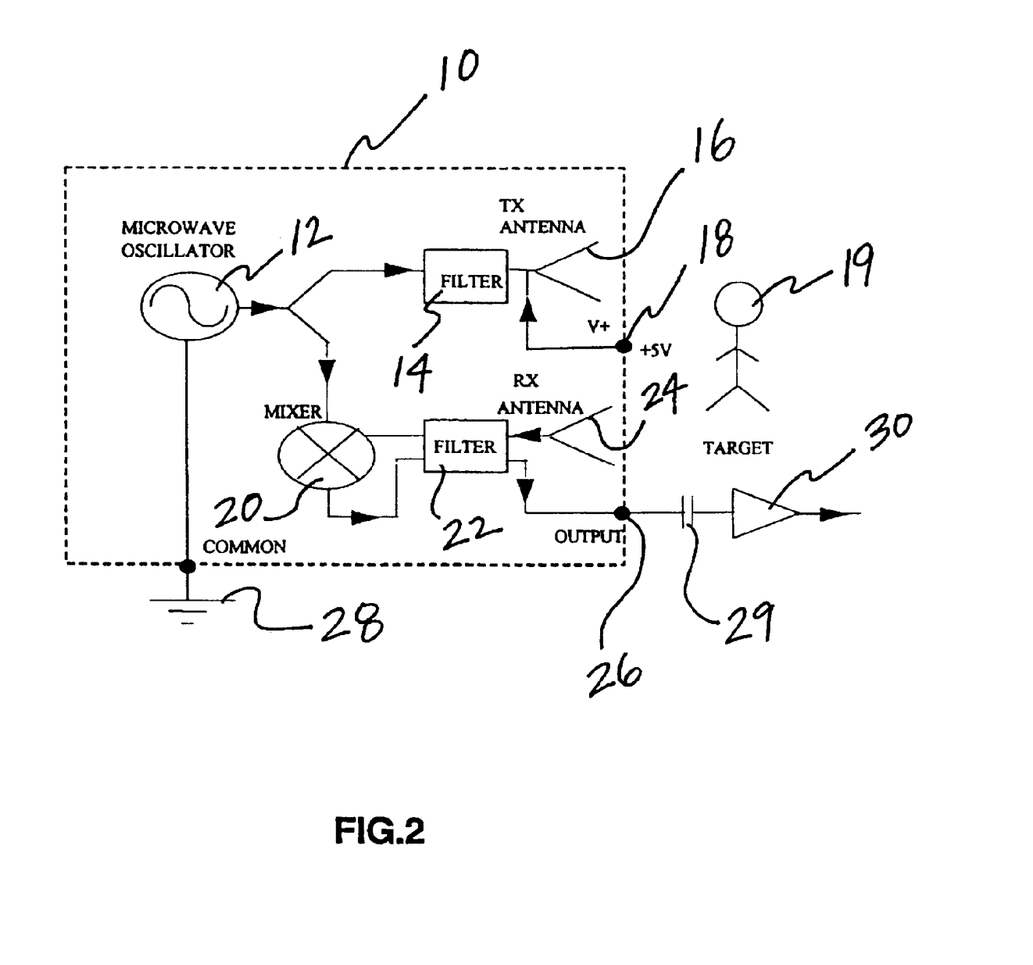
FIG. 2 is a schematic block diagram of the circuitry for the motion detector embodiment operating at the X-band frequency.

FIG. 2 illustrates a schematic block circuit diagram for the microwave circuitry located on the top side 3A of the main circuit board 3. The circuit for the present motion detector includes a microwave oscillator 12 for producing an oscillatory signal. The motion detector can accommodate an oscillator which produces either fixed or varying frequencies. In the preferred embodiment, the signal operates at an "X-band" frequency in the range of 9.35 GHz to 10.687 GHz, though other frequencies are possible. The oscillator is coupled to a ground 28 and to a filter 14 which is a low-pass filter with a relatively wide stop bandwidth. The filter is then coupled to a transmitting antenna 16 which radiates a microwave signal to a target 19 such as a human being. A power supply 18 is routed through the transmission antenna 16 and provides DC voltage to the microwave oscillator 12. While other filters are possible, in the preferred embodiment, the filter is made by cascading microstrip filters in two stages. By empirically "tuning" the filter, i.e., adjusting the length of the microstrips, a stop bandwidth of at least 6 to 7 GHz with 25 dB attenuation at around a cut-off frequency of 16 GHz is achievable.

Still referring to FIG. 2, the oscillator 12 is further coupled to a mixer 20. The mixer 20 is coupled to a filter 22 which is in turn coupled to a receiving antenna 24. The receiving antenna 24 receives the microwave signal which is reflected back from the target 19. The mixer 20 mixes the original signal from the oscillator 12 and the reflected signal received through the receiving antenna 24 to generate an intermediate frequency (IF) which is sent to an output channel 26 through the filter 22. The filter 22 is identical to the filter 14 in design. The output IF signal can then be sent to an external circuitry for processing. Typically, an amplifier 30 and a DC-blocking capacitor 29 are required to interface with the output channel 26.

Figure 3:
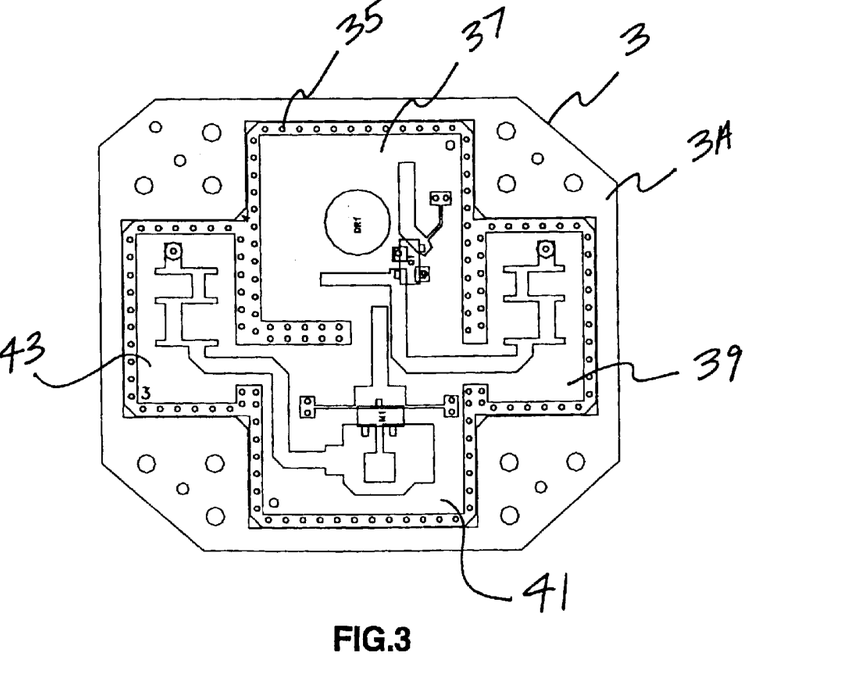
FIG. 3 is a plan view of the component side of the main circuit board illustrating the physical layout of the main circuitry for the motion detector operating at the X-band frequency.
Figure 4:
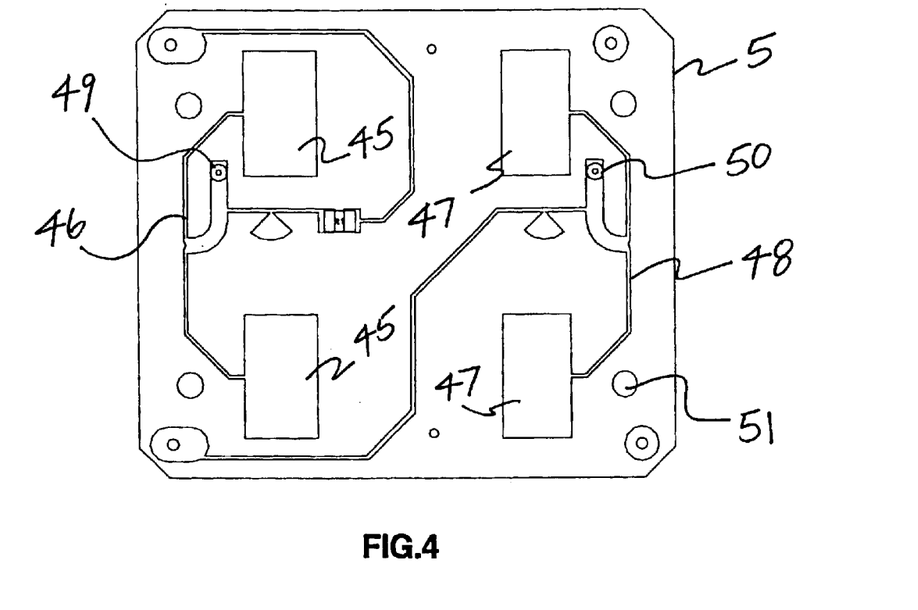
FIG. 4 is a plan view of the component side of the antenna circuit board illustrating the physical layout of the antenna circuitry for the motion detector operating at the X-band frequency.

FIGS. 3 and 4 illustrate the preferred embodiment of the physical layout of the microwave circuit board 3 and the antenna circuit board 4 as a way of implementing the circuitry 10 shown in FIG. 2. It should be understood, however, that while the layout shown in FIG. 3 is the preferred layout, there are other ways to implement the circuitry without deviating from the scope of the present invention.

FIG. 3 shows the physical layout of the component side (which is the top side 3A) of the circuit board 3. The board 3 includes a plurality of plated grounding through-holes 35 which are arranged in an elongated pattern which compartmentalize the circuitry. In this embodiment there are four main compartments. Referring now to both FIGS. 2 and 3, the first compartment 37 contains the circuitry for the microwave oscillator 12; the second compartment 39 contains the circuitry for the filter 14; the third compartment 41 contains the circuitry for the mixer 20; and the fourth compartment 43 contains the circuitry for the filter 22.

FIG. 4 shows the physical layout of the antenna circuit board 5 on the side opposite to the plated side 4A. This side comprises separate transmit 45 and receive antenna arrays 47. Each antenna array comprises two patch elements which are connected to common feed striplines 46 (for the transmit array 45) and stripline 48 (for the receive array 47). The stripline 46 for the transmit array 45 is connected via a wire 49 to the power supply 18. The stripline 48 for the receive array 47 is connected via a wire 50 to the output channel 26 which carries the intermediate frequency. The screw holes 51 at the corners of the antenna circuit board 5 provide a means for fastening the board 5 to the bottom side 2A of the casing 2.

FIG. 5 shows in detail the bottom side of the cover 4. The bottom side of the cover 4 has a set of partitioning walls 6 which are arranged in a pattern to coincide with the pattern of the plated grounding through-holes 35 shown in FIG. 3. Consistent with the physical layout of the circuit board 3 of the FIG. 3, the partitioning walls 6 generally define four compartmentalized cavities. When the cover 4 is placed over the circuit board 3, the cavity 55 encloses the compartment 37 of FIG. 3; the cavity 57 encloses the compartment 43; the cavity 61 encloses the compartment 39; and the cavity 59 encloses the compartment 41. In the preferred embodiment, the height H of the partitioning walls 6 is quarter wavelength of the operating frequency of the microwave oscillator 12 (FIG. 2), or one-half wavelength of the second harmonic frequency.

When the cover 4 is properly enclosed over the casing 2 carrying the main circuit board 3, the partitioning walls 6 should press firmly against the plated grounding through-holes 35 to assist in providing a good contact between the circuit board 3 and the plated floor 2B of the casing. The partitioning walls 6 assist in harmonic suppression by isolating the parts of the microwave circuitry to reduce any coupling of signals, and by shorting to ground any leakage of harmonic radiation which may occur.

Figure 6:
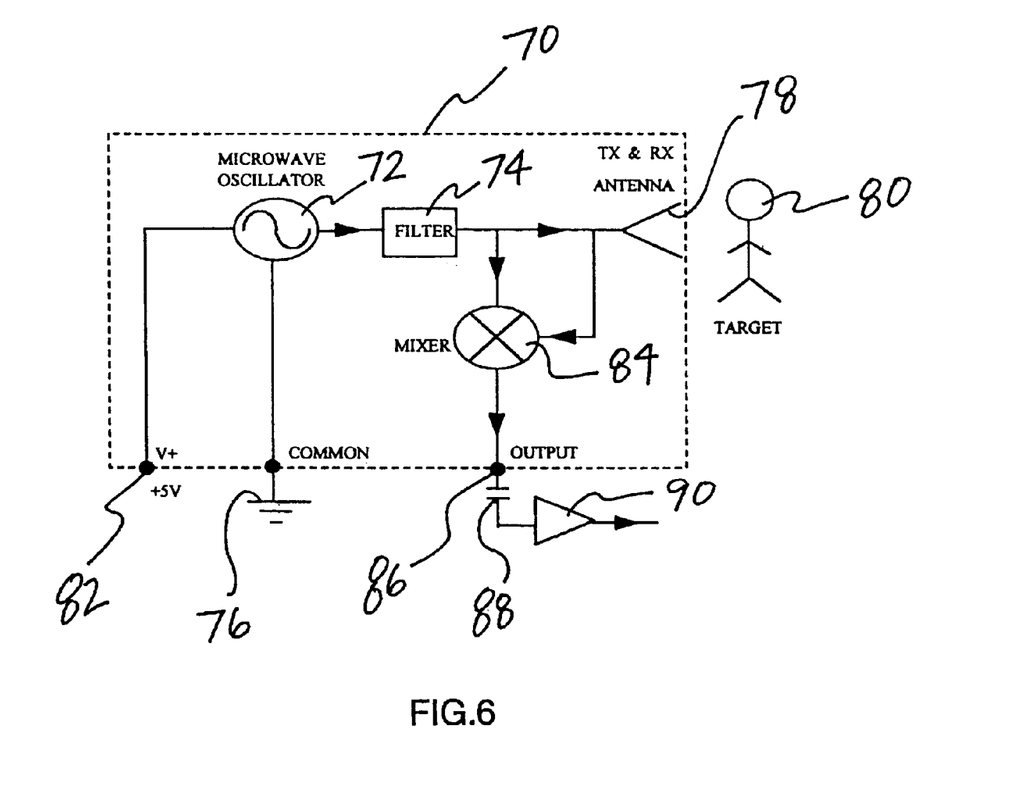
FIG. 6 is a schematic block diagram of the circuitry for the motion detector embodiment operating at the K-band frequency.

FIG. 6 illustrates a schematic block circuit diagram for an alternative embodiment of the present motion detector which operates at a "K-band" frequency of around 24 GHz. The circuit 70 for the present motion detector includes a microwave oscillator 72 for producing an oscillatory signal. The motion detector can accommodate an oscillator which produces either fixed or varying frequencies. In this embodiment, the signal operates at around 24 GHz. The oscillator is coupled to a ground 76, a power supply 82, and to a shielded low-pass filter 74. The filter 74 is then coupled to an antenna 78 which radiates a microwave signal to a target 80 such as a human being. In this embodiment, the antenna 78 also serves as the receiving antenna (hereinafter TX/RX antenna). Both the filter 74 and the TX/RX antenna 78 are coupled to a mixer 84 which combines the operating signal from the microwave oscillator 72 and the signal reflected back from the target 80 to produce an intermediate frequency (IF) signal. The intermediate frequency signal is sent to an output channel 86. The output IF signal can then be sent to an external circuitry for processing. Typically, an amplifier 90 and a DC-blocking capacitor 88 are required to interface with the output channel 86.

While other filters are possible, the filter 74 in this embodiment is made up of two stage "shielded microstrip" filter. By empirically "tuning" the filter i.e. adjusting the length of the microstrips, a stop bandwidth of at least 10 GHz with 25 dB attenuation at cut-off frequency of around 45 GHz is possible.

Figure 7:
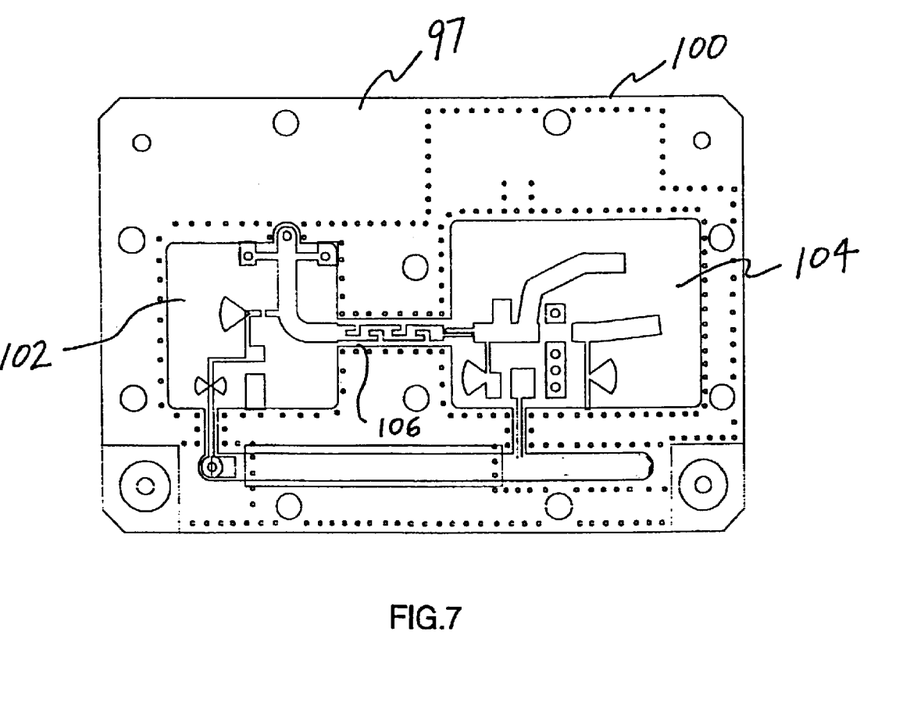
FIG. 7 is a plan view of the main component side of the main circuit board illustrating the physical layout of the main circuitry for the motion detector operating at the K-band frequency.
Figure 8:
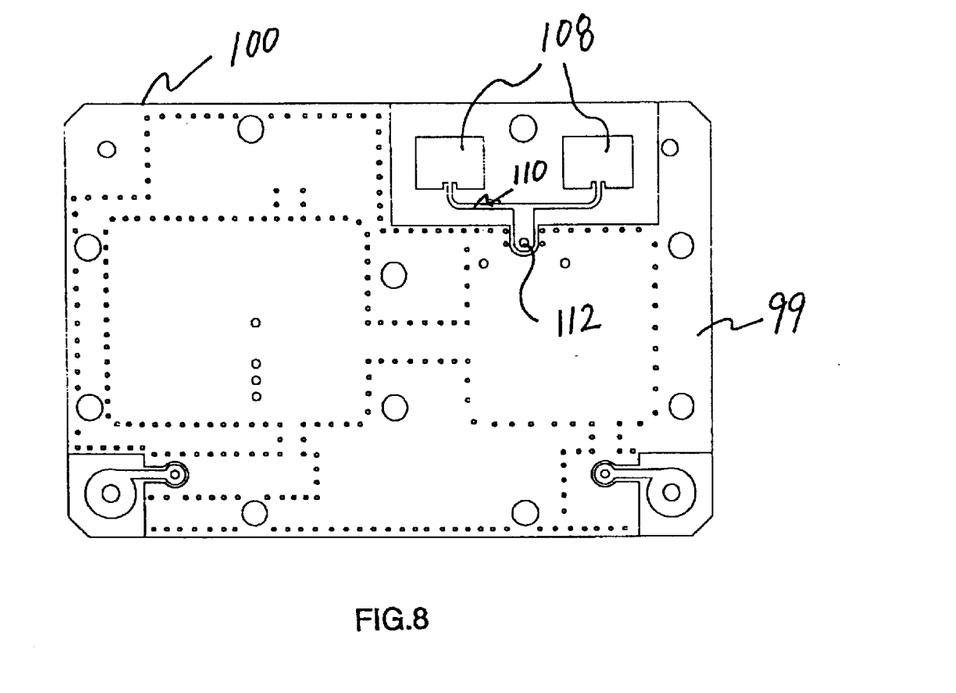
FIG. 8 is a plan view of the antenna circuit side of the main circuit board illustrating the physical layout of the antenna circuitry for the motion detector operating at the K-band frequency.
Figure 9:
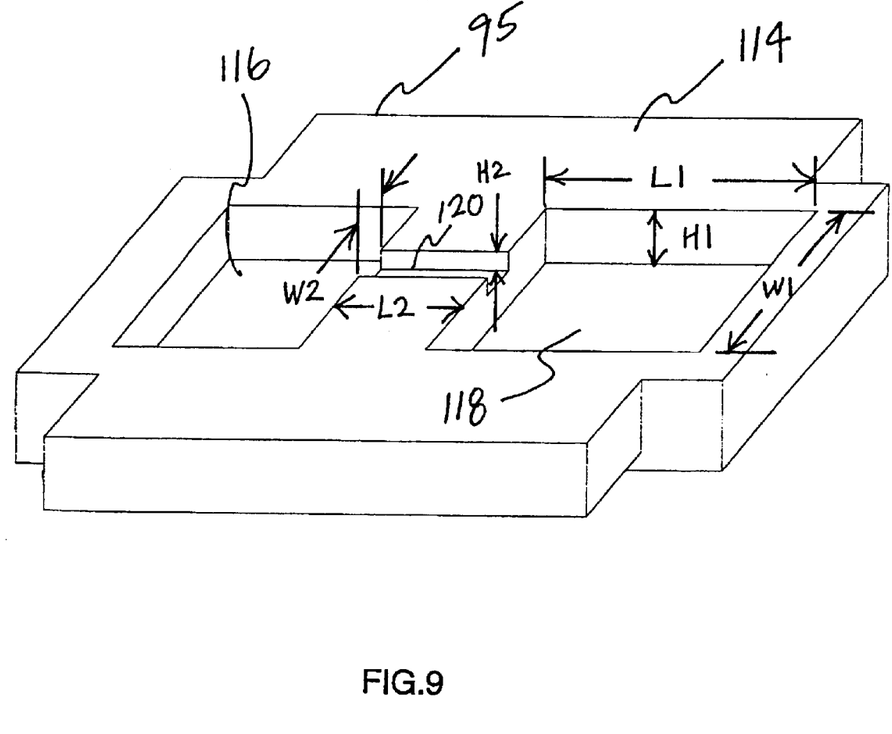
FIG. 9 is a perspective diagram of the bottom side of the cover for the motion detector operating at the K-band frequency.

FIGS. 7, 8, and 9 illustrate the physical layout of the present K-band motion detector. The present K-band motion detector comprises a cover 95, FIG. 9, which is placed over the dual-sided main circuit board 100. On the main component side 97, the main circuit board 100 has the main circuitry for the motion detector; on the other side, or the antenna circuitry side, of the circuit board 100 is the antenna circuitry. The cover 95 is placed over the main component side 97 of the main circuit board 100 such that the antenna circuit side 99 faces outward. The cover 95 can be made of various materials, but metal, such as aluminum, is preferred as K-band motion detectors typically require a tighter specification tolerance. The main circuit board may be made of various standard PCB materials such as R04003.

FIG. 7 shows in detail the physical layout of the main circuitry on the main component side 97 of the main circuit board 100. The layout of the main circuitry is divided into three compartments. In the first compartment 102 is the mixer circuit 89 (see FIG. 6); in the second compartment 104 is the oscillator circuit 72; and in the third compartment 106 is the filter circuit 74.

FIG. 8 shows in detail the physical layout of the antenna circuit side 99 of the main circuit board 100. The antenna circuit side 99 has a combined transmitting and receiving (TX/RX) antenna array. The TX/RX antenna array comprises two patch elements 108 which are connected to a common feed stripline 110. The stripline 110 is connected via a plated through-hole 112 to the filter 74 and mixer 84 (FIG. 6). By using a single set of patch elements as both the transmitting and receiving antennas, the emission of harmonic radiation is reduced.

FIG. 9 shows in detail the physical layout of the cover 95. The bottom side 114 of the cover 95 has three cavities. When the bottom side 114 of the cover 95 is placed over the main component side 97 of the main circuit board 100, the mixer cavity 116 lies over the first compartment 102 of the main circuit board 100, the oscillator cavity 118 lies over the second compartment 104, and the filter cavity 120 lies over the third compartment 106.

The harmonic signal is generated at the microwave oscillator 72. It has been demonstrated that by reducing the height H1 of the oscillator cavity 118 and the height H2 of the filter cavity, the harmonic radiating from the microwave oscillator 72 and the filter 74 can be reduced. However, it has also been demonstrated that a reduction in the height H1, reduces the mechanical tuning range of the microwave oscillator 72. To preserve the tuning range, the length L1 of the oscillator cavity 118 is adjusted until a satisfactory turning range is achieved. The exact dimensions of the cavities may be determined empirically. However, as an illustration, the dimensions of the cavities for one embodiment were the following:

Oscillator Cavity: H1=3 mm; L1=15 mm; W=11 mm
Filter Cavity: H2=1 mm; L2=7 mm; W2=2 mm It should be understood that these dimensions are presented here for illustration only and should not be construed as the only set of dimensions that would work.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims and all changes which come within the meaning and range of equivalency of the claims are, therefore, to be embraced therein.

We claim:

1. A motion detector comprising:
    a casing and a cover;
    a main circuitry disposed on a main circuit board resting inside said casing, said main circuitry comprising, a microwave oscillator, a mixer, a first filter and a second filter; said oscillator coupled to said first filter and said mixer, said first filter further coupled to a transmit antenna which is further coupled to a power supply, said mixer coupled to a second filter which is further coupled to a receive antenna and an output channel; and
    an antenna circuitry disposed outside said casing, said antenna circuitry comprising said receive and said transmit antenna.

2. The motion detector as claimed in claim 1, wherein said main circuitry further includes a plurality of plated through-holes in a pattern which compartmentalizes said circuitry such that said oscillator, said first filter, said second filter, and said mixer are in separate compartments.

3. The motion detector as claimed in claim 2, wherein said cover has partitioning walls in a pattern consistent with said pattern of said plated through-holes to isolate said compartments.

4. The motion detector as claimed in claim 3, wherein a height of said partitioning walls is quarter wavelength of an operating frequency of said microwave oscillator.

5. The motion detector as claimed in claim 4, wherein said microwave oscillator operates at a frequency in the range of 9.35 GHz and 10.687 GHz.

6. The motion detector as claimed in claim 5, wherein said first filter and said second filter are low-pass microstrip filters having a stop bandwidth of at least 6 GHz and a cut-off frequency above 16 GHz.

7. A motion detector comprising:
   a dual-sided main circuit board having a main component side and an antenna circuit side;
   a cover for enclosing said main component side of said main circuit board;
   a main circuitry disposed on said main component side of said main circuit board comprising a microwave oscillator, a filter, and a mixer, said oscillator coupled to said filter, said filter further coupled to said mixer and to a combined transmit/receive antenna, said transmit/receive antenna adapted for both sending and receiving a signal; and
   an antenna circuitry disposed on said antenna circuit side, said antenna circuitry comprising the transmit/receive antenna.

8. The motion detector as claimed in claim 7, wherein said microwave oscillator operates in a frequency of about 24 GHz.

9. The motion detector as claimed in claim 7, wherein said oscillator, said filter, and said mixer are in separate compartments.

10. The motion detector as claimed in claim 9, wherein said cover has a cavity for enclosing each said compartments.

11. The motion detector as claimed in claim 10, wherein said cavity compartment for said filter, and said compartment for said oscillator, have dimensions which sufficiently suppress harmonic frequencies and preserve an acceptable tuning range of said oscillator.

12. The motion detector as claimed in claim 11, wherein said filter is a low-pass microstrip filter having a cut-off frequency of about 45 GHz.

13. The motion detector as claimed in claim 9, wherein said main circuitry further includes a plurality of plated through-holes in a pattern which compartmentalizes said circuitry such that said oscillator, said filter, and said mixer are each in separate compartments.

14. The motion detector as claimed in claim 13, wherein said cover has partitioning walls in a pattern consistent with said pattern of said plated through-holes to isolate said compartments.

15. The motion detector as claimed in claim 14, wherein the plated through holes are contactable by the partitioning walls to provide a contact between the main circuit board and a grounding floor of the cover.

16. The motion detector as claimed in claim 15, whereby the partitioning walls assist in harmonic suppression by isolation of the main circuitry to reduce any coupling of signals.

17. The motion detector as claimed in claim 15, whereby the partitioning walls short to the grounding floor any leakage of harmonic radiation.

18. The motion detector as claimed in claim 3, wherein the plated through holes are contactable by the partitioning walls to provide a contact between the main circuit board and a grounding floor of the casing.

19. The motion detector as claimed in claim 18, whereby the partitioning walls assist in harmonic suppression by isolation of the main circuitry to reduce any coupling of signals.

20. The motion detector as claimed in claim 18, whereby the partitioning walls short to the grounding floor any leakage of harmonic radiation.

21. The motion detector as claimed in claim 18, wherein a height of said partitioning walls is quarter wavelength of an operating frequency of said microwave oscillator.

22. A motion detector comprising:
   a casing and a cover;
   a main circuitry disposed on a main circuit board resting inside said casing, said main circuitry comprising, a microwave oscillator, a mixer, a first filter and a second filter; said oscillator coupled to said first filter and said mixer, said first filter further coupled to a transmit antenna which is further coupled to a power supply, said mixer receivably coupled to a second filter which is further receivably coupled to a receive antenna and an output channel; and
   an antenna circuitry disposed outside said casing, said antenna circuitry comprising said receive and said transmit antenna.

* * * * *